(12) United States Patent
Ban et al.

(10) Patent No.: US 6,361,890 B1
(45) Date of Patent: Mar. 26, 2002

(54) FUEL CELL SYSTEM HAVING SCROLL TYPE COMPRESSOR AND REGENERATOR

(75) Inventors: Takashi Ban; Hirohisa Katoh; Masahiko Kimbara; Hidehito Kubo, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/435,979

(22) Filed: Nov. 8, 1999

(30) Foreign Application Priority Data

Nov. 9, 1998 (JP) .......................................... 10-317182

(51) Int. Cl.⁷ .............................................. H02M 8/04
(52) U.S. Cl. .......................................... 429/25; 429/34
(58) Field of Search .............................. 429/12, 25, 34

(56) References Cited

U.S. PATENT DOCUMENTS

| | | | |
|---|---|---|---|
| 5,434,016 A | 7/1995 | Benz et al. .................... 429/13 |
| 5,645,950 A | 7/1997 | Benz et al. .................... 429/13 |
| 6,117,577 A | * 9/2000 | Wilson ...................... 429/34 X |
| 6,124,052 A | * 9/2000 | Katoh et al. ............... 429/34 X |

FOREIGN PATENT DOCUMENTS

| | | | |
|---|---|---|---|
| GB | 2335710 | * | 9/1999 |
| JP | A-5-99164 | | 4/1993 |
| JP | A-7-14599 | | 1/1995 |
| JP | 9-133086 | * | 5/1997 |
| JP | 9-250463 | * | 9/1997 |
| JP | A-9-250474 | | 9/1997 |

* cited by examiner

Primary Examiner—Stephen Kalafut
(74) Attorney, Agent, or Firm—Morgan & Finnegan, LLP

(57) ABSTRACT

A fuel cell system includes a fuel cell, a motor, a scroll type compressor, connected to the air feeding pipe of the fuel cell and a scroll type regenerator connected to the air exhaust pipe of the fuel cell. The movable scrolls of the compressor and the regenerator are coupled to opposite ends of the motor output shaft in symmetry with each other. A pressure ratio of the regenerator is selected to be smaller than that of the compressor by an amount corresponding to a pressure loss of the exhaust gas across the fuel cell, so that the rotation of the regenerator never transmits a negative torque to the motor output shaft MC. Therefore, the regenerator can efficiently provide power assistance to the compressor.

7 Claims, 6 Drawing Sheets

US 6,361,890 B1

FUEL CELL SYSTEM HAVING SCROLL TYPE COMPRESSOR AND REGENERATOR

BACKGROUND OF THE INVENTION

1. Field of the Invention

The present invention relates to a fuel cell system which can recover pressure energy of an exhaust gas by expanding the exhaust gas in a regenerator after oxygen has been consumed in a fuel cell and using the recovery energy to assist the power driving the compressor.

2. Description of the Related Art

Japanese Unexamined Patent Publication (Kokai) No. 7-14599 discloses a fuel cell system. FIG. 6 in the attached drawings shows such a prior art, wherein air sucked through an air feeding conduit 60 is supplied to a fuel cell 63 after being pressurized to a certain pressure by a compressor 62 driven by an electric motor 61. Oxygen is consumed, from the supplied air, in the fuel cell, and an exhaust gas is discharged from the system to the atmosphere after being expanded in an expander 65 coupled to the compressor 62 and the motor 61 with a common shaft 64.

The produced water contained in the exhaust gas is separated by liquid separators 67 and 68 provided in an air discharging conduit 66, and is collected into an open type reservoir 69, from which the stored water is fed to a jet nozzle 71 by a pump 70 and injected into the air feeding conduct 60 for the purpose of humidifying the process air.

That is, as stated above, it is very efficient for the produced water contained in the exhaust gas in the fuel cell 63 to be separated and collected, for the purpose of humidifying the process air. Such water is usable not only for maintaining the proton conductivity of a cation exchange membrane in the fuel cell 63 but also for cooling and lubricating the compressor 62. In this respect, a scroll type compressor particularly could benefit from the use of such water, and there have been many proposals for improving the scroll type compressors or expanders.

However, when the residual (pressure) energy remaining in the exhaust gas from the fuel cell is converted to mechanical energy by the regenerator (expander) and fed to the compressor via the common shaft, a difference is generated between the pressure of the discharge air from the compressor and the pressure of the exhaust gas introduced into the regenerator due to a pressure loss in the fuel cell, whereby the exhaust gas is sometimes made to expand in the regenerator to a subatmospheric pressure, resulting in undesirable energy consumption.

SUMMARY OF THE INVENTION

An object of the present invention is to solve the above-mentioned problems in the prior art while maintaining merits of a scroll type compressor and a scroll type regenerator, by recovering the residual energy from the exhaust gas of a fuel cell to achieve an efficient power assist for the compressor without useless power consumption.

A fuel cell system, according to the present invention, for solving the above problems, comprises: a fuel cell having an air feeding passage and a gas exhaust passage; a scroll type compressor arranged in the air feeding passage, said compressor including a stationary scroll and a movable scroll; a scroll type regenerator arranged in the gas exhaust passage, said regenerator including a stationary scroll and a movable scroll; a motor having an output shaft having opposite ends; the movable scroll of the compressor being operatively coupled to one end of the output shaft of the motor, the movable scroll of the regenerator being operatively coupled to the other end of the output shaft of the motor symmetrically with the movable scroll of the compressor; and the pressure ratio of the regenerator being smaller than that of the compressor by an amount corresponding to the pressure loss of the gas across the fuel cell.

Since the compressor and the regenerator, both of which are of a scroll type, are coupled to the opposite ends of the motor output shaft, it is possible to realize an extremely simple air feeding mechanism which is particularly suitable for a vehicle fuel cell system. Also, since the pressure ratio of the regenerator is selected to a value capable of sufficiently compensating for a pressure loss of supplied air occurring in the fuel cell, it is possible to prevent a phenomenon from occurring in that exhaust gas introduced into the regenerator excessively expands to a subatmospheric pressure; in other words, the transmission of negative torque due to the rotation of the regenerator to the motor output shaft is completely avoidable to facilitate the effective power assist for the compressor.

If the fuel cell system is adapted so that the water separated from the exhaust gas is pumped to the water introduction device of the scroll type compressor, it is possible not only to humidify the supplied air but also to suitably cool and lubricate the compressor itself. Also, if both the compressor and the regenerator are arranged so that the peak variation of the torque of the compressor is generally in phase with the peak variation of the torque of the regenerator, the power transmission between the compressor and the regenerator is further enhanced. Moreover, if the number of scrolling walls formed in the movable scrolls of the compressor and the regenerator is adjustable, it is possible to easily select a suitable relative pressure ratio between the compressor and the regenerator in correspondence with the pressure loss within the fuel cell.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
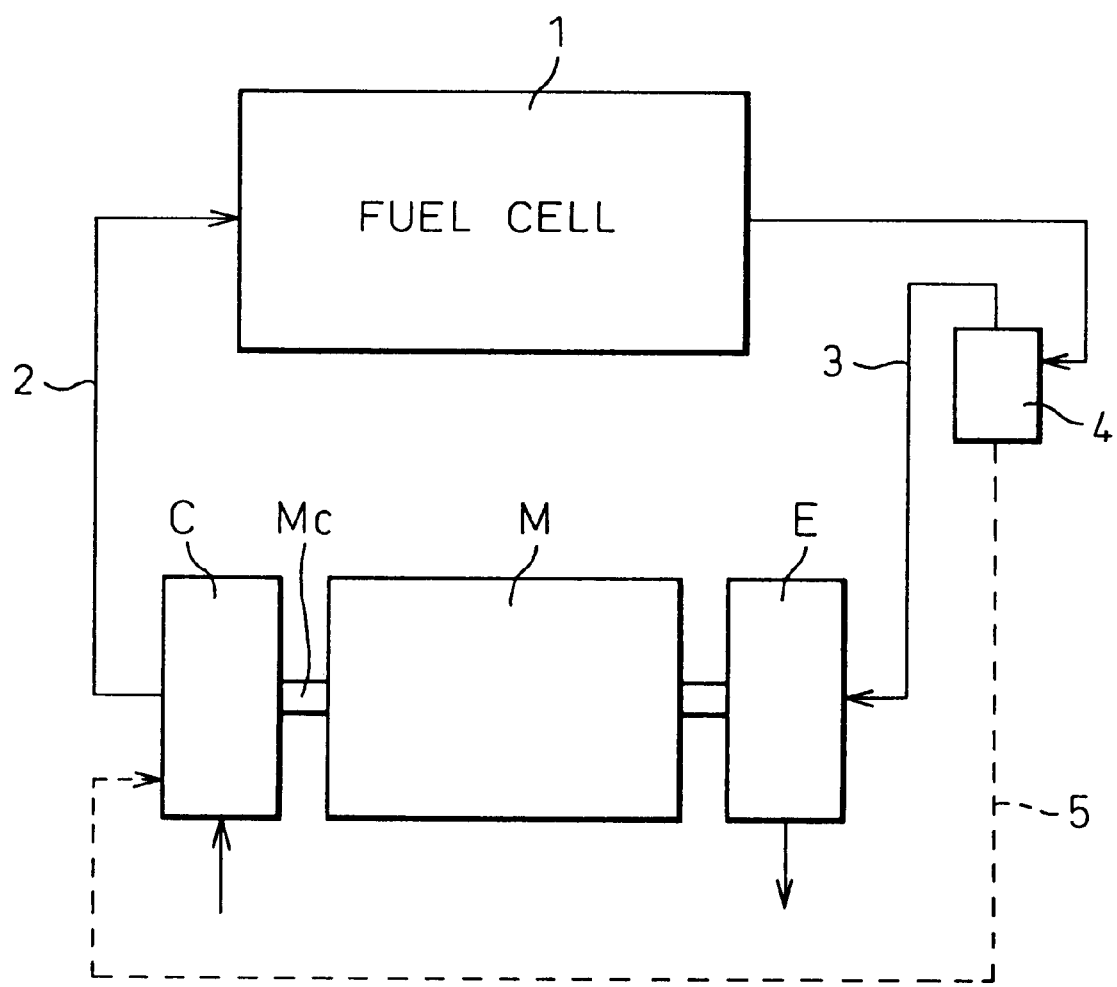
FIG. 1 is a diagrammatic view of a fuel cell system according to the embodiment of the present invention.

A fuel cell system will now be briefly described with reference to FIG. 1 schematically illustrating the same.

A fuel cell 1, as is already known, is formed of a layer of electrolyte, as if a flat plate and layers of anode and cathode arranged on either side of the electrolyte. Process air is fed to the fuel cell 1 from a compressor C through an air feeding pipe 2, passes through the anode space in the fuel cell 1 (not shown), and is then discharged from the fuel cell 1 via an air exhaust pipe 3. Gas rich in hydrogen or modified hydrogen is fed to the cathode space in the fuel cell 1 (not shown) via a fuel feeding path. When hydrogen reacts in the fuel cell 1 with oxygen contained in the process air, water and heat of reaction are produced as well as electric energy, and therefore an exhaust gas containing rich water vapor is exhausted from the fuel cell 1.

The exhaust gas is introduced into a regenerator (expander) E after moisture has been removed in a water separation tank 4 provided in the air exhaust pipe 3 so that residual pressure energy remaining in the exhaust gas is recovered. The regenerator E is operatively coupled to an output shaft Mc of a motor M along with the above-mentioned compressor C, wherein both the compressor C and the regenerator E are of a scroll type, in the present invention.

The present invention will now be described in detail with reference to FIG. 2, wherein the compressor C and the regenerator (Expander) E are constructed in a symmetric relationship with each other with exception of a partial difference, so the compressor C is mainly described and the detailed description of the regenerator E having the same structure as the compressor is omitted to avoid redundancy.

Figure 2:
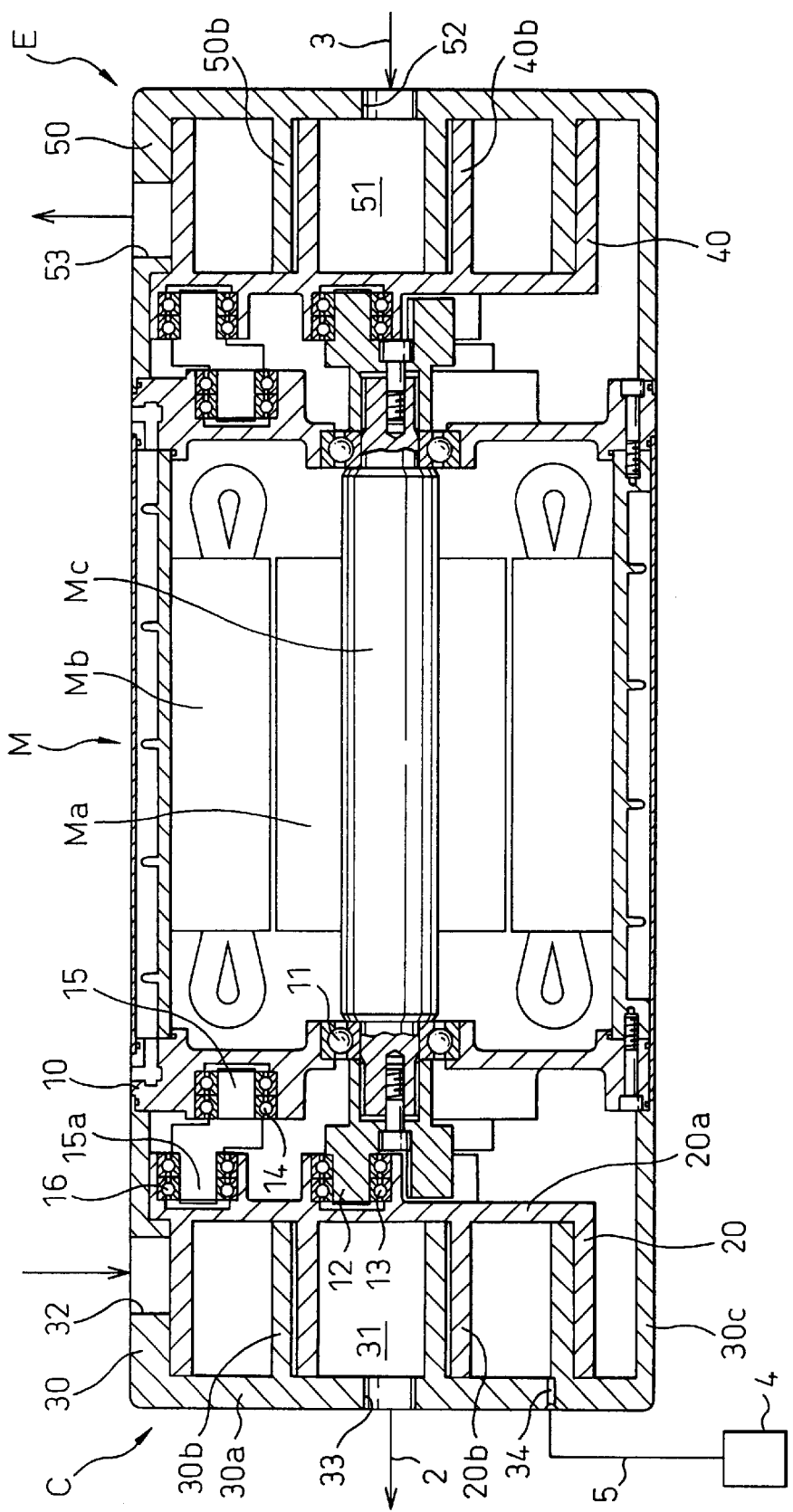
FIG. 2 is a cross-sectional view of the compressor and the regenerator used for the fuel cell system of FIG. 1.

In FIG. 2, the motor M has a housing 10, a rotor Ma, a stator Mb and an output shaft Mc, which is supported at its end portions in the housing 10 by bearings 11. A crank shaft 12 is coupled to each outer end of the output shaft Mc. The crank shaft 12 is formed integrally with a balancer and arranged in parallel to the motor output shaft Mc with a predetermined eccentricity. A movable scroll 20 is assembled for rotation to the crank shaft 12 via a bearing 13. The movable scroll has a base plate 20a and a movable scrolling wall (scroll tooth) 20b projecting from one side of the base plate 20a of the movable scroll 20. The movable scroll 20 is subjected to an orbital motion along a circular locus having a center at the axis of the output shaft Mc and a radius equal to the eccentric distance, when the output shaft Mc of the motor rotates. The movable scroll 20 is inhibited from rotating about its own axis by a self rotation preventing mechanism described later so that only an orbital rotation about the center of the motor output shaft Mc is allowed.

A stationary scroll 30 has a base plate 30a, an outer shell 30c formed in integral with the base plate 30a and fixed to the housing 10, and a stationary scrolling wall body 30b projecting from one side of the base plate 30a, wherein the movable scrolling wall 20b subjected to the orbital motion is meshed with the stationary scrolling wall 30b to define a working chamber 31 between the scrolling walls 20b and 30b. An intake port 32 is provided in the outer shell 30c of the stationary scroll 30 and a discharge port 33 is provided in the base plate 30a thereof, so that the intake port 32 and the discharge port 33 are in communication with the circumferential region and the central region of the working chamber 31, respectively, at predetermined phases.

Next, the self rotation preventing mechanism will be described. A plurality of auxiliary crank shafts 15 are arranged about the motor output shaft Mc, each having an auxiliary crank section 15a with the same eccentricity as the crank shaft 12 and being supported for rotation by a bearing 14 held in the housing 10, so that the respective auxiliary crank section 15a supports the movable scroll 20 via a bearing 16. In this regard, it should be noted that the self rotation preventing mechanism used for the scroll type compressor C and regenerator E according to the present invention is not limited to the above-mentioned arrangement.

Figure 3:
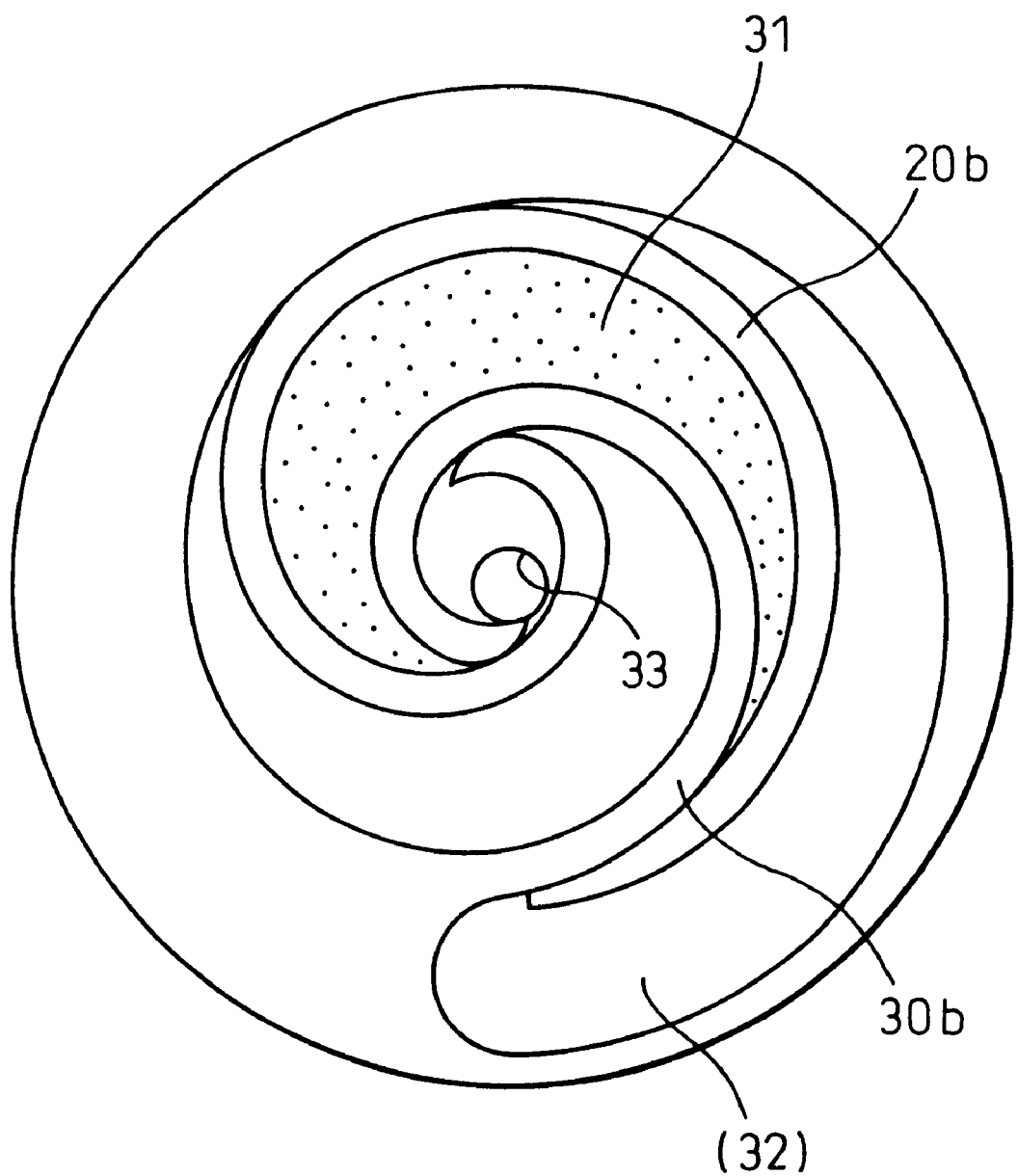
FIG. 3 is a view illustrating the working chamber defined by stationary and movable scrolls of the compressor, at an instant when intake air is just enclosed in the working chamber.
Figure 4:
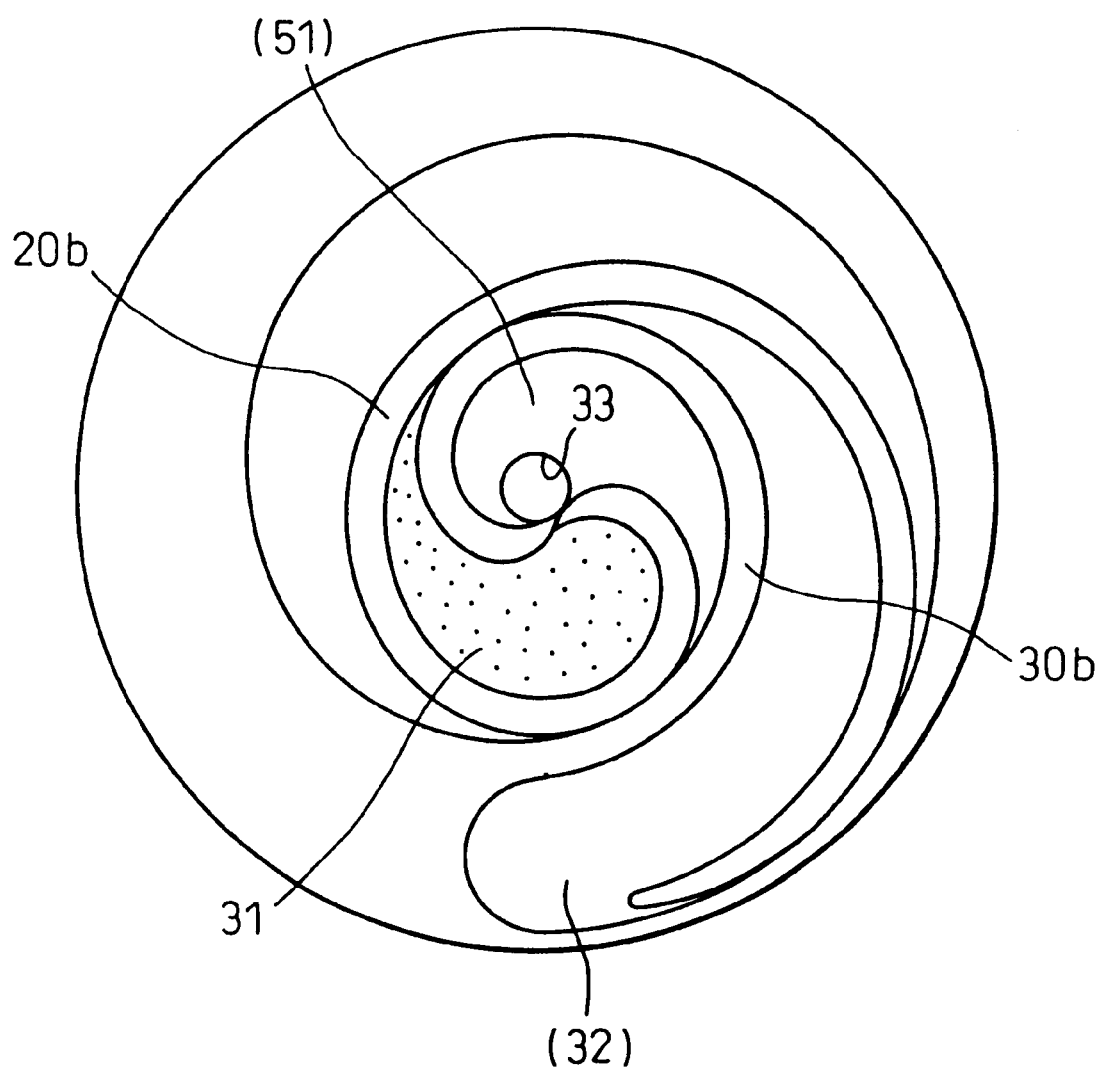
FIG. 4 is a view illustrating the working chamber at an instant after enclosing and compressing the intake air just before the chamber is in communication with the exhaust port.
Figure 5:
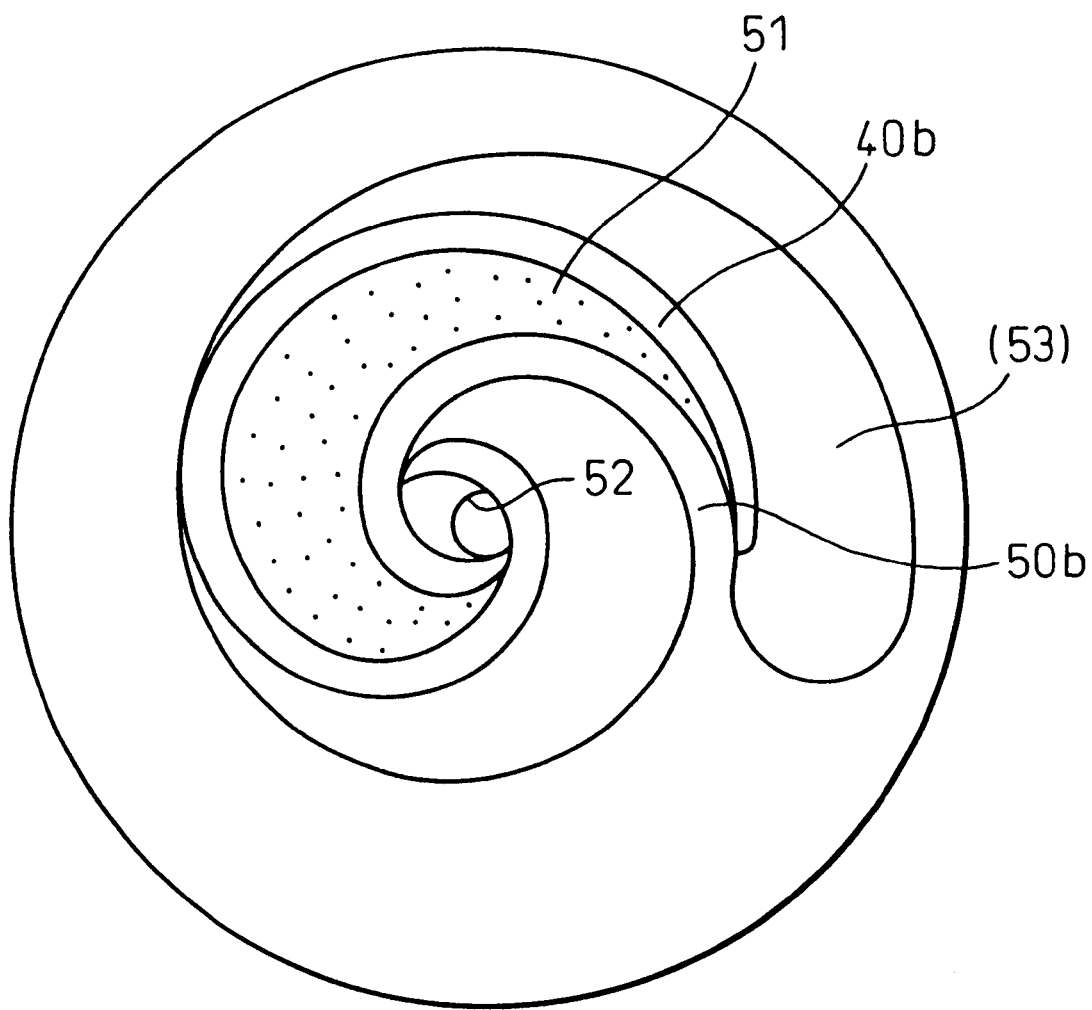
FIG. 5 is a view illustrating the working chamber defined by the stationary and movable scrolls of the regenerator, at an instant just before the chamber is in communication with the discharge port after being expanded due to the expansion of the exhaust gas.
Figure 6:
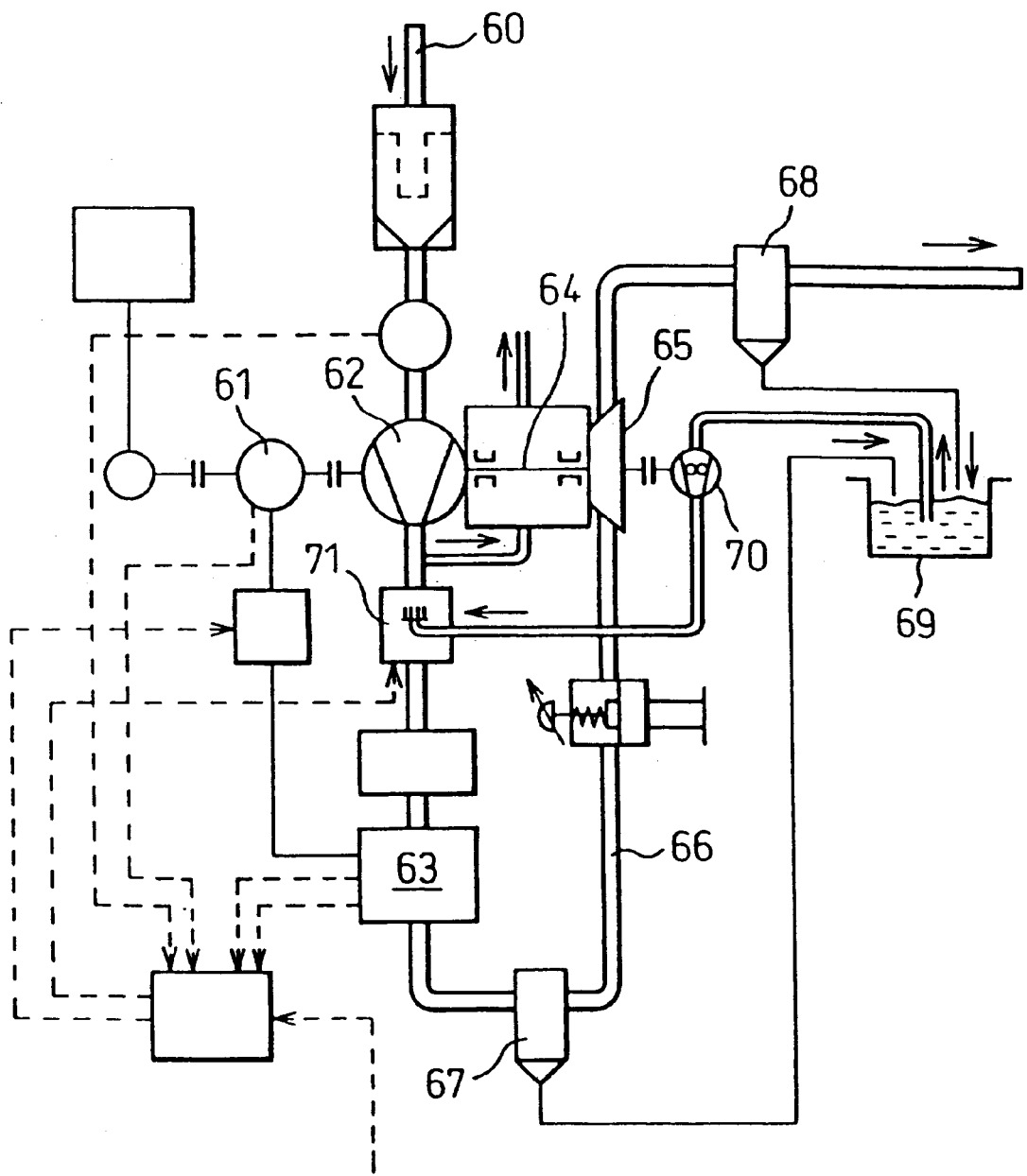
FIG. 6 is a diagrammatic view illustrating an arrangement of a prior art fuel cell system.

The most characteristic structure of the present invention will be described with reference to FIGS. 3 to 5. FIG. 3 illustrates the working chamber 31 defined between the movable scrolling wall 20b and the stationary scrolling wall 30b meshed with each other due to the orbital motion of the movable scrolling wall 20b within the compressor C at an instant when intake air is just enclosed therein; i.e., the working chamber 31 in the state having the outermost chamber volume. FIG. 4 illustrates the working chamber 31 in the state having the innermost chamber volume which has gradually been reduced and reached a point directly before the working chamber 31 is in communication with the exhaust port 33. FIG. 5 illustrates the movable scroll 40 and the stationary scroll 50 constituting the working chamber 51 of the regenerator E wherein each of the movable scrolling wall 40b and the stationary scrolling wall 50b has the number of turns less than that in the compressor C by ¼ turn so that a pressure ratio (expansion ratio) of the regenerator E relative to the compressor C is properly minimized to compensate for the pressure loss in the fuel cell 1. Especially, FIG. 5 illustrates the working chamber 51 in the state directly before the exhaust gas is released through the discharge port 53 while the volume thereof gradually increases due to the expansion of the introduced exhaust gas. That is, the difference between the outermost chamber volume of the compressor C and the outermost chamber volume of the regenerator E will be quite apparent from the comparison of FIG. 3 with FIG. 5. Such a pressure ratio of the regenerator E relative to the compressor C is controlled not only by the adjustment of the number of turns in the scrolling walls 40b and 50b but also by the change of a position or dimension of the introduction port 52 or the variation of a shape of a central portion of the scrolling walls 40b and 50b. Also, as shown in FIG. 4, the state at which the volume of the working chamber 31 is minimized just before the discharge of air, i.e., the timing at which the torque variation of the compressor C reaches a peak, substantially coincides in phase with the state at which the introduced exhaust gas is enclosed in the working chamber 51 having the innermost chamber volume, i.e., the timing at which the torque variation of the regenerator E reaches a peak, whereby the power transmission between the regenerator E and the compressor is further facilitated.

Accordingly, the process air pressurized to a predetermined pressure by the action of the compressor C driven by the motor M is supplied to the anode space of the fuel cell 1 through the air feeding pipe 2 and oxygen contained in the process air reacts with hydrogen supplied to the cathode space in a similar manner, so water and heat as well as electric energy are generated by the reaction. Then, exhaust gas rich in water vapor resulted from the reaction is discharged from the fuel cell 1. After the moisture has been removed from the exhaust gas at the water separation tank 4 provided in the air exhaust pipe 3, the exhaust gas is introduced into the regenerator E for recovering pressure energy remaining in the exhaust gas, while the separated and stored water is supplied to a water injector 34 of the compressor C via the water feeding path 5 for humidifying the process air as well as cooling and lubricating the compressor C.

The compressor C and the regenerator E, both of which are of a scroll type, are simply connected to opposite ends of the motor output shaft Mc, respectively, in symmetry with each other. Such an arrangement is particularly excellent because the compressor C has a high aptitude for being cooled and lubricated with water. A pressure loss of the process air occurring in the fuel cell 1 is, however, never negligible when the power assist for the compressor C is carried out by using the regenerator E disposed on the same shaft. That is, if such a pressure loss is not be taken into account when a pressure ratio is selected in the compressor C and the regenerator E, the exhaust gas introduced into the regenerator E might excessively expand to a subatmospheric pressure and consume additional power. Contrarily, according to the present invention, as is apparent from a comparison between FIGS. 3 and 5, the pressure ratio (expansion ratio) of the regenerator E is determined to be smaller, by an amount corresponding to a pressure loss of the fuel cell 1, than that of the compressor C. Therefore, it is possible to completely avoid the excessive expansion of the exhaust gas to a subatmospheric pressure, in other words, the inconvenience in that the rotation of the regenerator E transmits a negative torque to the motor output shaft Mc. Also, as shown in FIG. 4, the movable scrolls of the compressor C and the regenerator E are arranged in phase so that at an instant, just before the discharge of air from the working chamber 31 and the torque variation of the compressor C reaches a peak, generally coincides with an instant at which the introduced exhaust gas is sealed in the working chamber 51 and also the torque variation of the regenerator E reaches a peak, whereby the power transmission between the both is further facilitated.

As described in detail above, according to the present invention, the compressor and the regenerator, both of which are of a scroll type, are coupled to opposite ends of the motor output shaft in symmetry with each other, which significantly simplifies the structure and reasonably offsets axial thrusts applied to both of the movable scrolls each other. Since the pressure ratio of the regenerator is selected to compensate for the pressure loss of the process air within the fuel cell, it is possible to inhibit the negative torque from being transmitted from the regenerator to the motor output shaft, whereby a motor driving current is favorably reduced. Also, if the stored water separated from the exhaust gas is directly supplied to the water injector of the compressor, it serves not only for humidifying the process air but also for cooling and lubricating the compressor. If the movable scroll of the compressor and the regenerator are arranged in phase so that the torque variation of the compressor generally coincides with that of the regenerator, it is possible to achieve power assistance for the compressor with a higher efficiency.

What is claimed is:

1. A fuel cell system comprising:
   a fuel cell having an air feeding passage and a gas exhaust passage;
   a scroll compressor arranged in the air feeding passage, said compressor including a stationary scroll and a movable scroll;
   a scroll regenerator arranged in the gas exhaust passage, said regenerator including a stationary scroll and a movable scroll;
   a motor having an output shaft having opposite ends;
   the movable scroll of the compressor being operatively coupled to one end of the output shaft of the motor, the movable scroll of the regenerator being operatively coupled to the other end of the output shaft of the motor symmetrically with the movable scroll of the compressor; and
   a pressure ratio of the regenerator being smaller than that of the compressor by an amount corresponding to a pressure loss of the gas across the fuel cell.

2. A fuel cell system according to claim 1, further comprising a water separation tank provided in the gas exhaust passage and having a water storage portion, a water injecting device provided in the compressor, and a water feeding passage interconnecting the water storage portion and the water injecting device.

3. A fuel cell system according to claim 1, wherein the movable scroll of the compressor and the movable scroll of the regenerator are arranged so that a timing of peak torque variation of the compressor is substantially in phase with a timing of peak torque variation of the regenerator.

4. A fuel cell system according to claim 1, wherein a relative pressure ratio of the compressor to the regenerator is controlled by the number of turns of the scrolling walls of the movable scrolls of the compressor and the regenerator.

5. A fuel cell system according to claim 1, wherein said motor comprises a housing, a stator and a rotor to which said output shaft is coupled, said stationary scroll of the compressor and said stationary scroll of the regenerator being secured by the housing.

6. A fuel cell system according to claim 1, wherein the movable scroll of the compressor is coupled to one end of the output shaft of the motor via an eccentric shaft member and a bearing, and the movable scroll of the regenerator is coupled to the other end of the output shaft of the motor via an eccentric shaft member and a bearing.

7. A fuel cell system according to claim 1, further comprising a self-rotation preventing mechanism for the movable scroll of each of the compressor and the regenerator.

* * * * *

UNITED STATES PATENT AND TRADEMARK OFFICE
CERTIFICATE OF CORRECTION

PATENT NO. : 6,361,890 B1
DATED : March 26, 2002
INVENTOR(S) : Takashi Ban et al.

It is certified that error appears in the above-identified patent and that said Letters Patent is hereby corrected as shown below:

<u>Title page,</u>
Item [57], ABSTRACT,
Line 11, please delete "MC" and insert therefor -- Mc --

Signed and Sealed this

Tenth Day of September, 2002

Attest:

JAMES E. ROGAN
Attesting Officer          Director of the United States Patent and Trademark Office